(12) United States Patent
Johnson

(10) Patent No.: US 7,390,979 B1
(45) Date of Patent: Jun. 24, 2008

(54) CONDUIT CONNECTOR ASSEMBLY

(75) Inventor: Steven J. Johnson, Galien, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/606,351

(22) Filed: Nov. 30, 2006

(51) Int. Cl.
*H02G 3/18* (2006.01)

(52) U.S. Cl. .................. 174/655; 174/650; 174/659; 16/2.1; 285/194; 439/98

(58) Field of Classification Search ............... 174/650, 174/655–668, 151, 152 G, 153 G, 152 R, 174/153 R, 59–61; 16/2.1, 2.2; 248/56; 439/98, 583, 610, 921, 552, 557; 285/194
See application file for complete search history.

(56) References Cited

U.S. PATENT DOCUMENTS

| | | | |
|---|---|---|---|
| 1,238,799 A | | 9/1917 | Marchand |
| 1,725,883 A | | 8/1929 | Recker |
| 2,466,504 A | | 4/1949 | Stoyer |
| 2,639,927 A | | 5/1953 | Billeter |
| 2,865,978 A | * | 12/1958 | Modfrey .................. 174/69 |
| 4,198,537 A | * | 4/1980 | Mariani .................. 174/660 |
| 4,619,332 A | * | 10/1986 | Sheehan .................. 174/659 |
| 5,204,499 A | | 4/1993 | Favalora |
| 5,266,050 A | * | 11/1993 | O'Neil et al. ............. 439/552 |
| 5,704,400 A | * | 1/1998 | Eldridge .................. 138/96 T |
| 5,731,543 A | | 3/1998 | Jorgensen |
| 5,912,431 A | * | 6/1999 | Sheehan .................. 174/653 |
| 6,020,557 A | | 2/2000 | Jorgensen |
| 6,034,326 A | | 3/2000 | Jorgensen |
| 6,380,483 B1 | | 4/2002 | Blake |
| 6,444,907 B1 | | 9/2002 | Kiely |
| 7,154,054 B1 | * | 12/2006 | Gretz .................. 174/655 |
| 2005/0269122 A1 | | 12/2005 | Pyron |
| 2006/0000631 A1 | | 1/2006 | Blake |

* cited by examiner

*Primary Examiner*—Dhiru R Patel
(74) *Attorney, Agent, or Firm*—Garrett V. Davis; Mark S. Bicks; Alfred N. Goodman

(57) ABSTRACT

A conduit connector assembly which receives an end of a conduit carrying electrical wires includes a body, a grommet and a spring clip. The grommet and the spring clip are each mounted to the body. The spring clip is disposed within an interior bore of the fitting body and has a resiliently flexible body and a leg having a gripping end portion. The grip end has a substantially scalloped configuration for gripping and fitting partially about the conduit so as to center the grip end of the spring clip body on the conduit. The spring clip also includes a latching member to couple with the body to hold the spring clip in position and apply a biasing tension of the gripping end of the leg against the conduit. The grip end having the scalloped configuration is in the form of an arcuate concave-shaped edge surface on the gripping end portion of the body. The grip end of the spring clip body makes line contact with an inner convolution on an exterior of the conduit and makes at least a single point contact with an outer convolution on the exterior of the conduit. The grip end may be disposed at a predetermined angle for matching a predetermined pitch angle of the convolutions on the exterior of the conduit and thereby make line contact with the inner convolution on the exterior of the conduit and make a pair of point contacts with the outer convolution on the exterior of the conduit.

29 Claims, 7 Drawing Sheets

CONDUIT CONNECTOR ASSEMBLY

FIELD OF THE INVENTION

The present invention is directed to a conduit connector assembly for connecting an electrical conduit to an electrical box. More particularly the invention is directed to a conduit connector assembly for coupling to an armored cable prior to connecting to an electrical box.

BACKGROUND OF THE INVENTION

Electrical wiring is connected to an electrical box which supports various electrical devices such as switches and electrical receptacles. The wiring in some environments includes an armor cable wound around the wiring to protect the wiring. The armor cable must then be coupled to the electrical box. A variety of coupling devices have been produced for connecting the armor cable or conduit to the electrical box.

Electrical wiring is used for connecting electrical power lines and electrical outlets in order to provide access to electrical power in residential and commercial buildings. Electrical junction boxes are provided in the buildings to receive portions of the electrical wiring and contain and isolate therein splices in the wiring which extends from the junction boxes to the main electrical power lines and to outlets and switches in the building. For protection of the electrical wiring, the wiring is generally housed and carried within metal conduits or metal cables. It is also desirable to connect ends of the metal conduits to the electrical junction boxes.

Examples of various coupling devices and connectors are disclosed in U.S. Pat. No. 5,731,543, U.S. Pat. No. 6,020,557 and U.S. Pat. No. 6,034,326 which are incorporated herein by reference in their entirely include a body and a spring clip. The spring clips couple the armor cable to the body with a spring tension when the devices are inserted into the opening in the electrical box. These devices do not enable the armor cable to be attached to the body before installation into the electrical box.

A variety of devices have been used over the years for connecting conduits which carry electrical wires to electrical junction boxes. Representative examples of these devices are disclosed in U.S. Pat. No. 3,369,071 to Tuisku, U.S. Pat. No. 4,012,578 to Moran et al., U.S. Pat. No. 4,021,604 to Dola et al., U.S. Pat. No. 4,880,387 to Stikeleatheret al., U.S. Pat. No. 4,990,721 to Sheehan, U.S. Pat. No. 5,171,164 to O'Neil et al., U.S. Pat. No. 5,204,499 to Favalora, U.S. Pat. No. 5,276,280 to Ball, U.S. Pat. No. 5,285,013 to Schnell et al., U.S. Pat. No. 5,373,106 to O'Neil et al. and U.S. Pat. No. 5,422,437 to Schnell.

One example of a conduit connector, includes a fitting body having an interior bore with four integral end tabs folded ninety degrees to serve as an end stop at a first opposite end of the fitting body for insertion into an electrical junction box and a spring clip for attachment at the bottom of a second opposite end of the fitting, body for gripping a conduit carrying electrical wires inserted within the fitting body. While this connector device has performed with satisfaction over the years and has met objectives it was originally designed to achieve, the device does not meet current performance standards. As in the case of any product, over time improvements are required.

While the above noted connectors generally satisfy the intended need, there is a continuing need in the industry for improved conduit connector devices.

SUMMARY OF THE INVENTION

The present invention is directed to a connector assembly for connecting an electrical cable to an electrical box. The invention is particularly directed to a connector that is able to be coupled to a cable such as an armored cable before coupling the connector to an electrical box.

The present invention provides a conduit connector assembly for connecting a conduit carrying electrical wires to an electrical box. The electrical box is typically used to support electrical devices such as switches and electrical outlets. The connector in one embodiment of the invention includes three components coupled together for coupling to the conduit and to the electrical box.

The electrical connector assembly of the invention is simple to manufacture and assemble. The connector assembly can be connected to the conduit such as an armored cable before transporting to the work site. The pre-assembly of the connector to the conduit provides easy assembly at the work site which reduces loss of parts and without the need to assemble the components at the work site.

The invention is also directed to a connector assembly having a body and a spring clip that is connected to the body. The spring clip attaches the conduit to the body and connects the body to the electrical box.

The connector assembly of the invention provides a spring clip coupled to a body member and has a first end that is able to engage the outer surface of the conduit to retain the conduit in the axial passage of the body. The spring clip is also provided with a latch mechanism to connect with the body under the tension of the spring clip. The tension on the spring clip applies a force to the first end of the clip to apply a gripping force to the conduit.

The invention further provides a spring clip for a conduit connector assembly having at least one coupling hook to connect the spring clip to the body of the connector to prevent separation of the spring clip from the body.

A further aspect of the invention is to provide a conduit connector having a spring clip that can be incorporated into existing connector assemblies to couple the conduit to the body for the ease of assembly of the conduit to an electrical box.

The various aspects of the invention are basically attained by providing a conduit assembly for attaching a conduit to an electrical box where the assembly includes a body, a grommet and a spring clip. The body has a first end and a second end where the first end is open to receive the end of an electrical conduit. The second end has an end wall with a central opening to allow electrical wiring from the conduit to pass through. The body has a dimension to pass through and couple to an opening in an electrical box. The body includes a stop member extending outwardly from a side of the body to limit the insertion of the body through the opening in the electrical box. The grommet is inserted on the end of the conduit and around the wires and is inserted into the open end of the body. The spring clip is coupled to the body and has an end extending into the cavity of the body toward the conduit for engaging the conduit and retaining the conduit within the body. The spring clip has an opposite end extending in a forward direction with respect to the body outside the body. The second end of the spring clip has hooks that are positioned to hook onto an inner edge of the opening in the electrical box to couple the body to the electrical box. The spring clip applies a biasing force to engage the electrical box and to enable the first end of the spring clip to engage the conduit with a gripping force. The spring clip includes a latch member that latches to the body to couple the spring member to the body and apply a biasing force to the first end of the spring member independently of the biasing force by the second end to couple the conduit to the body before the spring is coupled to the electrical box.

The aspects of the invention are also attained by providing a conduit connector assembly for coupling an electrical conduit to an electrical box, the connector assembly comprising a body having a side wall with a first end and a second end and an axial passage extending between said first end and said second end. A first end of the body has a dimension to be inserted into an opening of an electrical box, the body having an opening in the side wall. The axial passage has a dimension to receive the electrical conduit. A grommet is provided having a cylindrical portion received in the first end of the body and having a collar forming a stop member for contacting the first end of the body. A spring clip is coupled to the body, where the spring clip has a main body portion overlying the side wall of the body. A first leg extends from the main body portion and extends into the axial passage through the second end of the body. A latch member extends from the main body. The latch member has an arm extending from the main body portion through the side wall of the body. A latching tab is provided on an end of the arm to engage the body whereby the first leg of the spring clip applies a biasing force against the conduit to capture the conduit within the body.

The aspects of the invention are further attained by providing a conduit connector assembly for coupling a conduit to an electrical box, where the conduit connector comprises a body having a side wall with a first open end and a second open end and an internal axial passage extending between said first end and said second end. The first end has a dimension to be inserted into an opening in a side wall on an electrical box.

A grommet is received in said the end of the body and has an outer dimension to fit within an open end of the conduit. A spring clip is coupled to the body where the spring clip has a main body portion with a first leg having a gripping end extending inwardly into the axial passage for engaging the conduit to capture the conduit within the axial passage. The main body portion of the spring clip has a latch member for latching to the body to position the first leg to apply a constant biasing force of the gripping end against the conduit.

These and other aspects of the invention will become apparent form the following detailed description of the invention which taken in conjunction with the annexed drawings discloses various embodiments of the invention.

BRIEF DESCRIPTION OF THE DRAWINGS

The following is a brief description of the drawing in which.

DETAILED DESCRIPTION OF THE INVENTION

Figure 1:
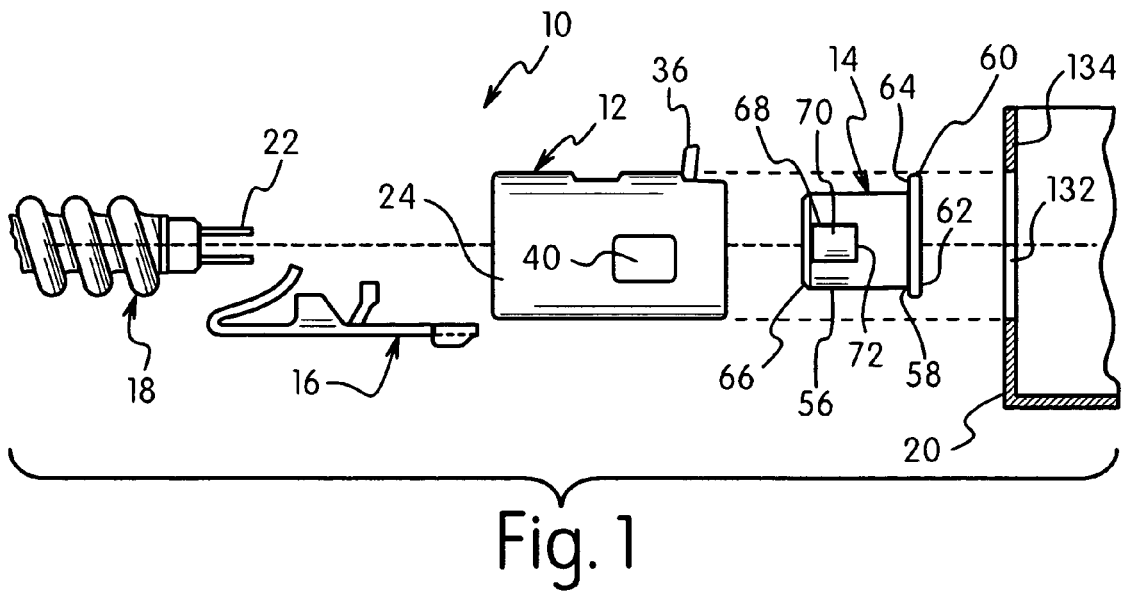
FIG. 1 is an exploded side view of the connector assembly in one embodiment of the invention.

The present invention is directed to a conduit connector assembly for coupling a conduit to an electrical box. The invention is particularly directed to a conduit assembly that is able to couple an electrical conduit to a body of the assembly prior to coupling to an electrical box.

The assembly of the invention provides a structure that enables the conduit to be connected to the connector assembly so the connector is retained on the end of the conduit before assembly with the electrical box. The assembly allows pre-assembly of the conduit to the connector assembly to simplify the assembly at the work site. The conduit connector assembly of the invention basically includes a body, a grommet and a spring clip. The spring clip is attached to the body to grip the conduit to the body and to attach the body to an electrical box. The conduit is typically a spirally wound, corrugated armor cable as known in the art.

Referring to the drawings the conduit connector assembly 10 of the invention includes a body 12, a grommet 14 and a spring clip 16. The conduit connector assembly 10 is proved for connecting a conduit 18 to an electrical box 20. The conduit 18 is typically a flexible conduit such as a standard armor cable that carries a plurality of wires 22. In the embodiment illustrated the conduit 18 is a metal sheath that is wound in a spiral fashion to define a corrugated protective casing as known in the art. As shown the conduit is formed with a spiral groove defined between peaks and valleys. The armor sheath is cut to length to expose the wires 22 to form an electrical connection with the desired electrical device as know in the art. The sheath is typically formed of steel although other metals can also be used.

Body 12 has a construction substantially similar to the body shown and described in U.S. Pat. No. 6,034,326 which is hereby incorporated by reference in its entirety. Body 12 is formed from a rigid material such as steel other metal and is shaped by bending a blank into a generally cylindrical shape having an axial passage. Body 12 has a cylindrical side wall portion 24 and a flat side portion 26. Side portion 26 in one embodiment has side edges of the blank spaced from each other to define a slot 50 extending the length of the body. The slot 50 enables the body to be expanded or contracted to fit within an opening of an electrical box as needed. Cylindrical side wall portion 24 has shape and dimension to fit within the opening of the electrical box.

Figure 2:
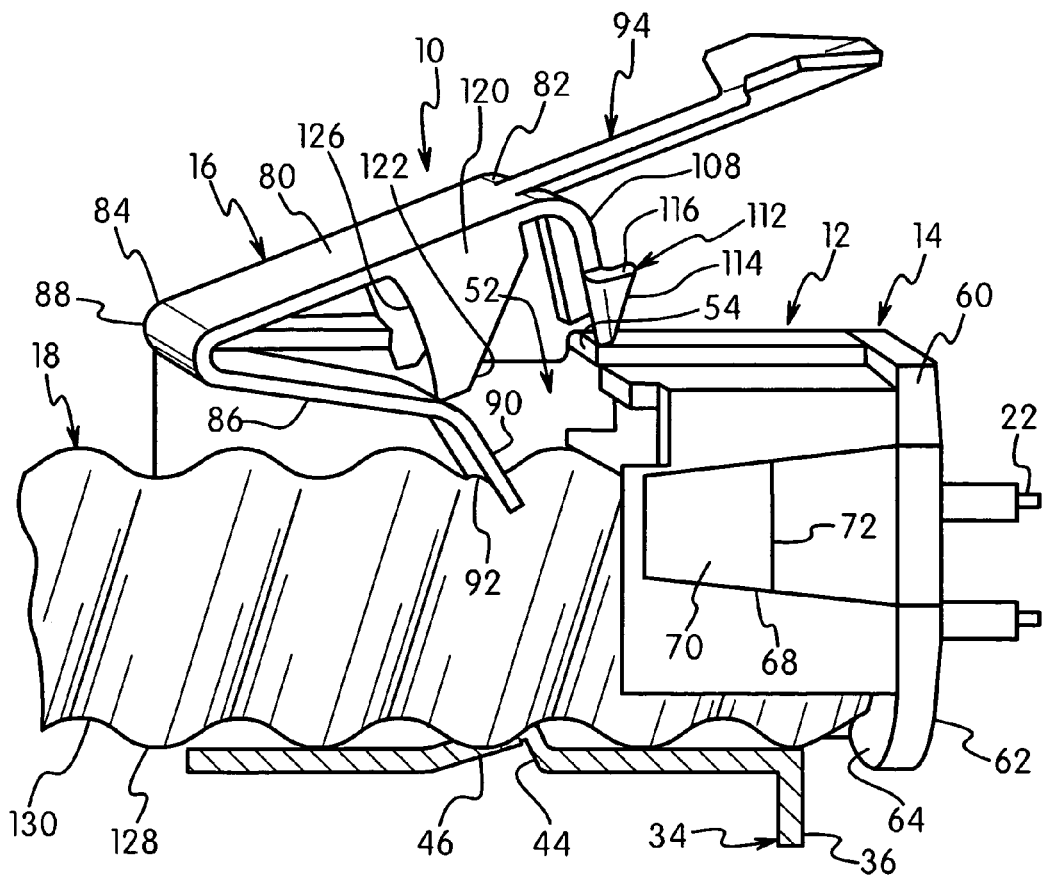
FIG. 2 is a side view in cross section showing the connector assembly in an initial position engaging a conduit before latching the spring clip to the body.
Figure 6:
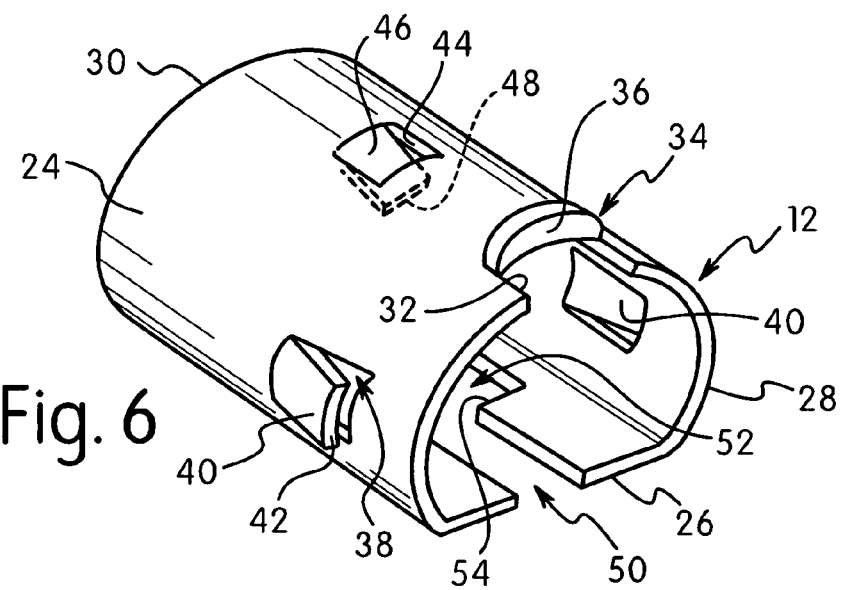
FIG. 6 is a perspective view of the body of the connector assembly.

Referring to FIGS. 2 and 6, body 12 has a forward first open end 28 for inserting into the electrical box 20 and a second trailing open end 30. First end 28 has substantially flat edge and a cut out portion 32 opposite the flat side potion 26. Cut out portion 32 is formed with a connecting tab 34 bent outwardly with respect to the axial dimension of body 12 to define cut out portion 32. Connecting tab 34 has a shape and dimension to contact the inner surface of electrical box 20 when assembly 10 is coupled to electrical box 20. Connecting tab 34 has a substantially flat outer face 36 perpendicular to the axis of body 12 and parallel to first end 28.

Cylindrical portion 24 has openings 38 cut into side portions on opposite sides about 90 degrees from the tab 34 as shown in FIG. 6. Openings 38 are cut into cylindrical portion 34 to form tabs 40 that are bent outwardly with respect to body 12. Tabs 40 are angled to extend in a generally forward direction toward first end 28 and have an end face 42 parallel with connecting tab 34. End face 42 of tab 40 lies in a plane spaced from the plane of the inner face of connecting tab 34 a distance corresponding substantially to the thickness of the wall of electrical box 20 as discussed in greater detail hereinafter. Tabs 40 contact an outer surface of the wall of the electrical box when assembled.

Figure 3:
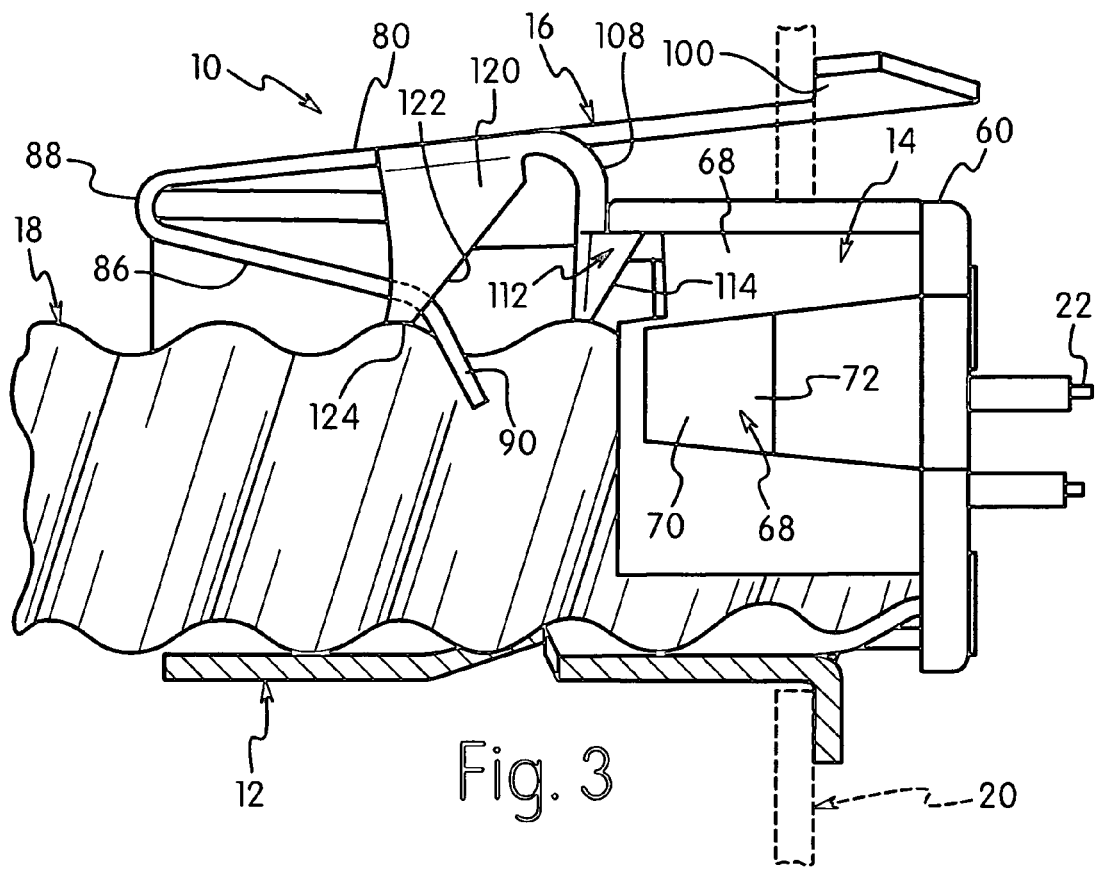
FIG. 3 is side view in cross section showing the connector assembly with the spring clip in a latching position to capture the conduit within the connector assembly.

In the embodiment illustrated, cylindrical portion 24 of body 12 has an opening 44 cut into cylindrical portion 24 and axially aligned with the connecting tab 34 as shown in FIG. 6. Opening 44 is spaced axially from connecting tab 34 with respect to the longitudinal axis of body 12. Opening 44 is cut from body 12 to form a gripping tab 46 that is bent inwardly into the body 12. As shown in FIGS. 3 and 6, gripping tab 46 is bent at an inclined angle and extends toward the first end 28 of body 12. Gripping tab 46 has a forward end 48 facing first end 28 and spaced from connecting tab 34. In a preferred embodiment, forward end 48 gripping tab 46 is formed at a slight angle with respect to the longitudinal axis of body 12 to enable gripping of the conduit.

Flat portion 26 of body 12 as discussed above has slot 50 extending the axial length of body 12. An opening 52 is formed in flat side portion 26 spaced from first end 28 of body 12. Opening 52 is formed by cut-outs in each edge of body 12 defining slot 50 and has substantially flat forward edges 54. Forward edges 54 are formed parallel to the first end 28 of body 12 and spaced from connecting tab 34. As discussed hereinafter, opening 52 receives spring clip 12. In alternative embodiments, opening 52 can be formed in cylindrical wall portion 24.

Grommet 14 has a substantially cylindrical shape with a body 56 forming a sleeve and defining an internal cavity for receiving the wires from the conduit. Grommet 14 has a first end 58 with a collar 60 extending outward in a radial direction. Collar 60 has an outer face 62 and an inner face 64. Collar 60 has a radial dimension sufficient to engage the end of the conduit 16 to protect the wires 22 from contacting the end of the conduit to prevent damage to the wires during use. Grommet 14 is typically formed from a molded plastic material as a one piece member. Grommet 14 is formed with an axial passage extending completely through grommet 14 from first end 58 and collar 60 to a second end 66 with open ends. Body 56 of grommet 14 includes locking tabs 68 integrally formed therewith and extending in an outward direction with respect to grommet 14. Locking tabs 68 have an inclined portion 70 converging toward second end 66 of grommet 14 and have a forward end face 72 facing first end 58 and being substantially parallel to collar 60. Grommet 14 is typically a one piece member made of molded plastic.

Figure 5:
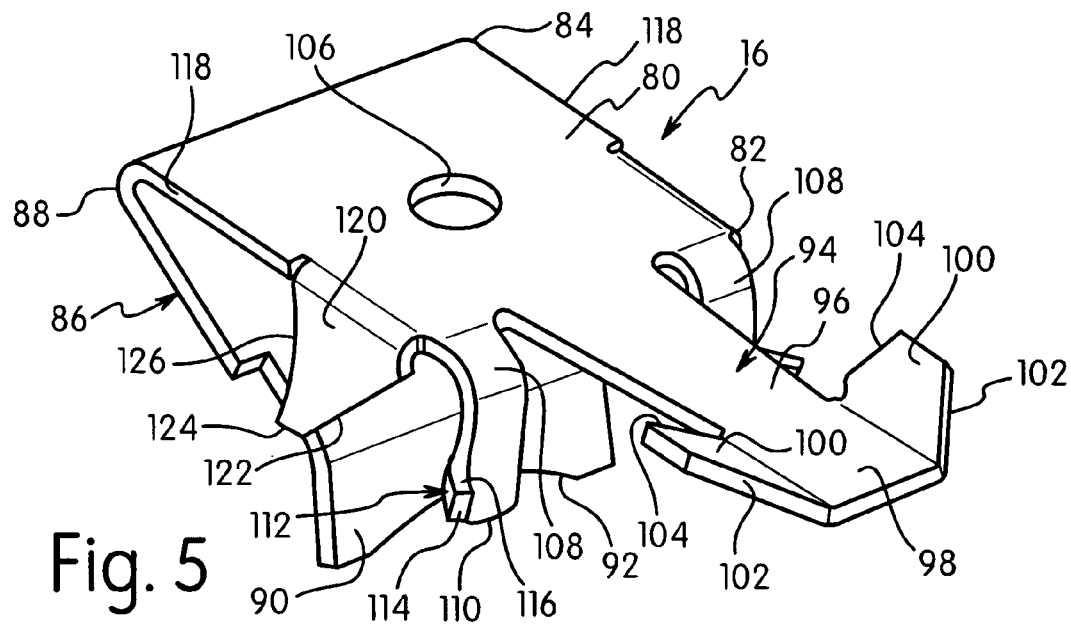
FIG. 5 is a perspective view of the spring clip in one embodiment of the invention.

Spring clip 16 of assembly 10 is made of spring steel or other suitable material. As shown in FIGS. 3 and 5 spring clip 16 has a generally J-shape as shown in the figures with a main body portion 80 having a first end 82 and second end 84. Main body portion 80 has a substantially flat shape. A first leg 86 is coupled to second end 84 of body portion 80. First leg 86 is formed by a curved bent portion 88 or elbow and is bent to extend in a reverse direction toward a first end 82 of body potion 80 at an incline away from body portion 80. First leg 86 terminates in a curved end section 90 having a concave or recessed gripping end 92. Gripping end 92 has a shape and dimension to engage the outer surface of a conduit when the connector assembly is attached to the conduit.

Figure 4:
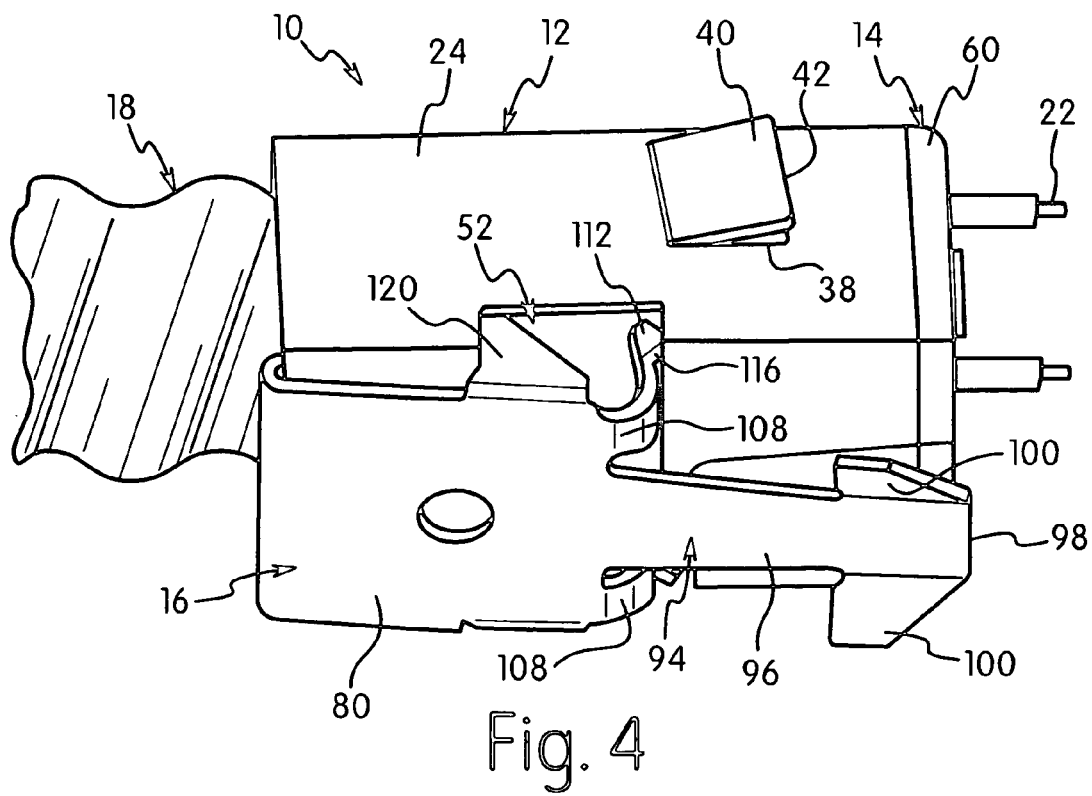
FIG. 4 is perspective view of the connector assembly.

A second end 84 of body portion 80 of spring clip 16 has a second leg 94 extending in a longitudinal direction with respect to body portion 80. In the embodiment shown, second leg 94 is formed in the same plane as body portion 80 and extends in a forward direction with respect to spring clip 16. Second leg 94 has an elongated body portion 96 and an end portion 98. End portion 98 is formed with a pair of integrally formed coupling tabs 100 that are bent out of the plane of second leg 94 and in a generally outward direction in a direction opposite to first leg 86. As shown in FIGS. 3, 4 and 5 coupling tabs 100 are bent from the second leg 94 along opposite side edges and are formed at an incline away from the plane of second leg 94. Coupling tabs 100 have an inclined forward edge 102 and a substantially straight coupling edge 104 extending substantially perpendicular to the axial dimension of second leg 94. The forward edges 104 of coupling tabs 100 define a pointed end to be inserted into an opening of electrical box 20. The coupling edges 104 form a gripping edge to connect the spring clip 16 and assembly 10 to the electrical box 20.

Main body portion 80 has a circular hole 106 as shown in FIG. 5. Second leg 94 in the embodiment shown has a width less than the width of main body portion 80. First end 82 of main body portion 80 includes arms 108 positioned adjacent second leg 94 and bent to extend in a downward direction substantially perpendicular to second leg 94. As shown, arms 108 are integrally formed with main body portion 80 and curve away from second leg 94. Arms 108 terminate at an end 110 and are formed with a latch member shown as latching tabs 112. Latching tabs 112 are bent out of the plane of arms 108 in the embodiment shown. Latching tabs 112 are bent slightly to extend in a forward direction toward the end of second leg 94. As shown latching tabs 112 extend outwardly from spring clip 16. In alternative embodiments, latching tabs 112 can extend inwardly toward the body portion 96 of second leg 94. Latching tabs have an inclined bottom edge 114 to assist in inserting the latching tabs 112 into body 12 and flat latching edge 116 to couple to the body 12.

Main body portion 80 of spring clip 16 has side edges 118 formed with fin-like retaining tabs 120. Retaining tabs 120 extend substantially perpendicular to the plane of body portion 80. Retaining tabs 120 have a first inclined edge 122 converging toward body portion 80 and a straight outer edge 124. Retaining tabs 120 further include a curved second edge 126 extending from outer edge 124 to the respective side edge 118 of body portion 80.

Connector assembly 10 is coupled to conduit 18 for attaching to electrical box 20. Initially, conduit is cut to the desired length and the electrical wires 22 are cut to extend from the end of conduit 18. Grommet 14 is then attached to conduit by inserting the body portion into the axial passage of conduit 18 so that wires 22 extend through the axial passage of grommet 14 a length to be available for coupling with a desired electrical device (not shown) within the electrical box 20. Grommet 14 is positioned on the end of conduit 18 so that collar 60 contacts the axial end of conduit 18.

Spring clip 12 is attached to body 14 by sliding the first leg 86 until the axial passage of the main body 12 below the flat side 26 of body 12 from the rearward or second end of body 12 as shown in FIG. 2 until the curved portion 88 of spring clip 12 contacts the end of body 12. Main body portion 80 of spring clip 12 overlies the outer surface of the flat side 26 of the body 12. The first leg 86 extends into the axial passage of body 12 through second end 30. Opening 52 in body 12 has a dimension corresponding to a width of spring clip 16 and is positioned to receive the retaining tabs 120. As shown in FIGS. 2 and 3, retaining tabs 120 are inserted into opening 52 to retain spring clip 16 on body 12. Conduit 18 is inserted into the open end of body 12 from the rearward second end 30 to extend through body 12 to expose the wires 22 at the open front end. Grommet 14 is placed over the exposed end of the conduit 18 so that wires 22 extend through the opening in grommet 14. Grommet 14 is inserted into the open end of body 12 and is seated against the front end of body 12 as shown in FIG. 2. Locking tabs 68 on grommet 14 slide into the axial passage of body 12 and are received in opening 38 to couple grommet 14 to body 12.

Conduit 18 in preferred embodiments of the invention is a spiral wound metal sheath that is formed with hills 128 and valleys 130 and has a dimension to fit within the passage of body 12. Gripping tab 46 of body 12 extends inwardly a distance to engage conduit and preferable contact a valley 130 of conduit 18 to position conduit 18 within body 12. Main body portion 80 of spring clip 16 is then depressed which causes first leg 86 to pivot, contact and grip the outer surface of conduit 18 and to insert retaining tabs 120 through opening 52 of body 12. Preferably, curved end 92 of first leg 86 contacts a valley portion of the conduit 18. The angle of the gripping end 90 of first leg 86 preferably is aligned with the angle of the spiral winding of the conduit to assist in gripping the conduit and preventing movement of the conduit within the connector assembly 10. The curved edges 126 of retaining tabs 120 of spring clip 12 contact the rearward edges of opening 52 to capture the spring clip 16 and conduit 18 in body 12. Body potion 80 of spring clip 12 is depressed further until latching tabs 112 are inserted into opening 52 and the latching edges 116 latch onto the inner edges of body 12 at the forward end of opening 52 as shown in FIG. 3.

The curved edges of the retaining tabs 120 engage the rearward edges of opening 52 and the latching tabs 112 engage the forward end of opening 52 so that the spring clip 16 is secured to body 12 to resist separation of spring clip 16 from body 12 and to resist longitudinal movement of spring clip 16 within body 12. In addition, the latching tabs 112 when hooked to the edges of opening 52 apply a spring biasing force to bias first leg 86 of spring clip 12 into contact with conduit 18 to couple conduit 18 to body 12 prior to inserting assembly 10 into an opening in the electrical box.

Figure 7:
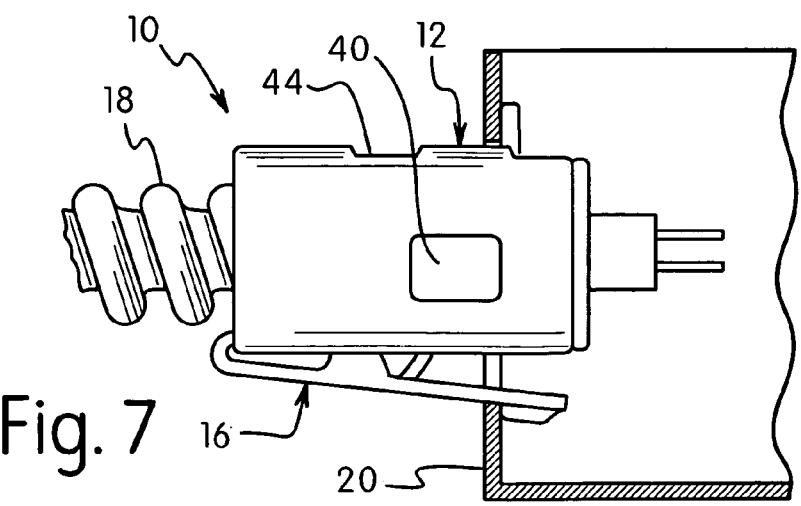
FIG. 7 is a side view in partial cross section showing the connector assembly coupled to an electrical box.

Once assembly 10 and conduit 18 are coupled together, assembly 10 is then connected to electrical box 20. Electrical box 20 is typically a standard electrical box having one or more knock-outs or pry-outs to define an opening 132 through the side wall 134 of electrical box 20. Assembly 10 is inserted through opening 132 from the outside with wires 22 extending into the internal cavity of electrical box 20. As shown in FIG. 7, assembly 10 is inserted through opening 132 at an angle so that connecting tab 34 is positioned within the electrical box to contact an inner surface of side wall 134. Assembly is then straightened so that tabs 40 contact the outer surface of side wall 134 and the tabs 100 of second leg 94 hooks onto the inner face of side wall 134 to retain assembly coupled to electrical box 20.

Referring to FIGS. 8-15, a second embodiment of the connector assembly 150 is shown. Connector assembly 150 is similar to connector assembly 10 except for the spring clip 152. Accordingly, similar elements are identified by the same reference numbers as in the embodiment of FIGS. 1-7 with the addition of a prime.

Figure 8:
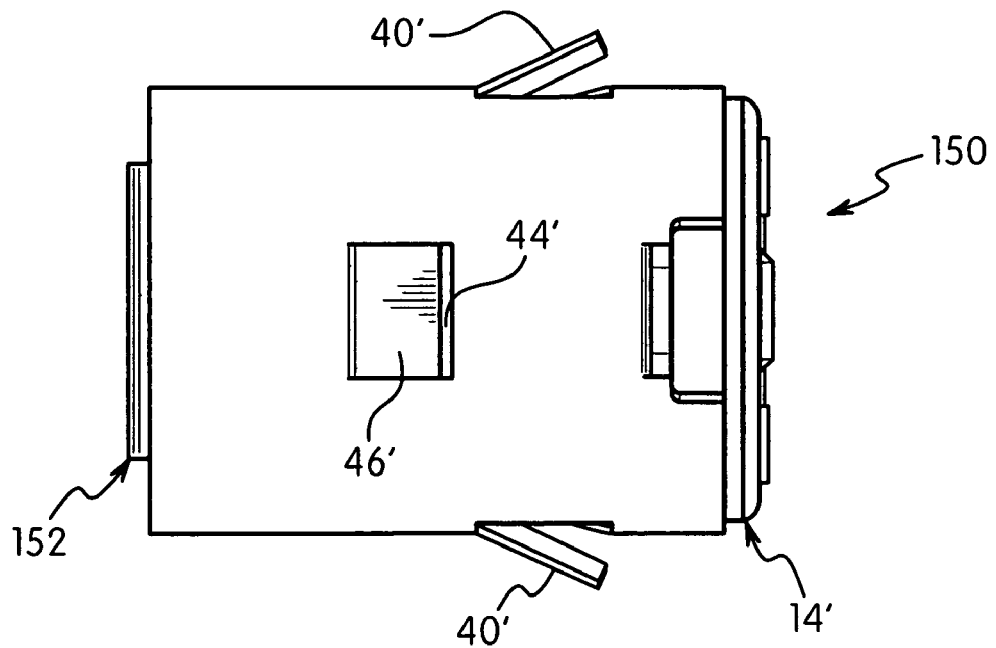
FIG. 8 is a top view of a second embodiment of the connector assembly of the invention.
Figure 9:
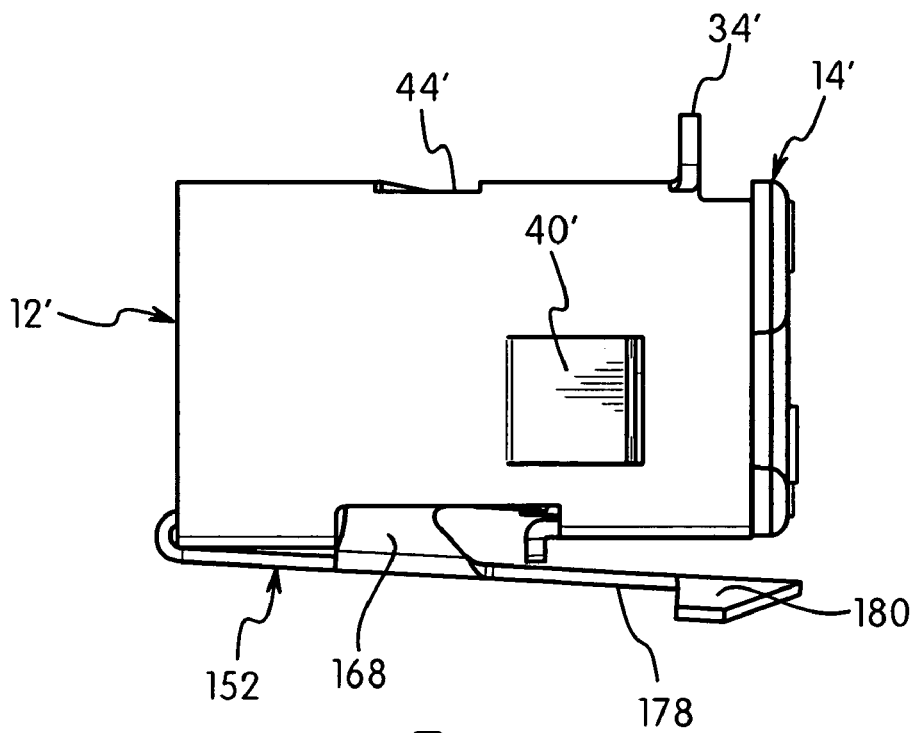
FIG. 9 is a side view of the connector assembly of the embodiment of FIG. 8.

Referring to the drawings, the connector assembly 150 includes a body 12', a grommet 14' and the spring clip 152. As shown in FIGS. 8 and 9, grommet 14' is inserted into the axial passage of body 12' at a first end.

Figure 10:
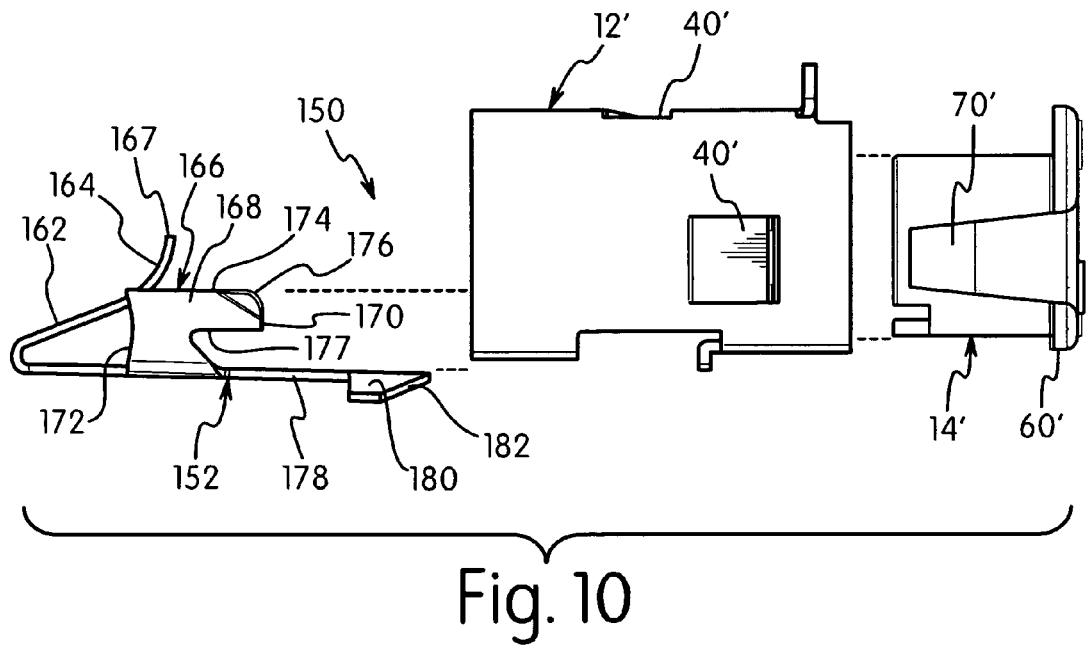
FIG. 10 is an exploded side view of the connector assembly of the embodiment of FIG. 8.
Figure 11:
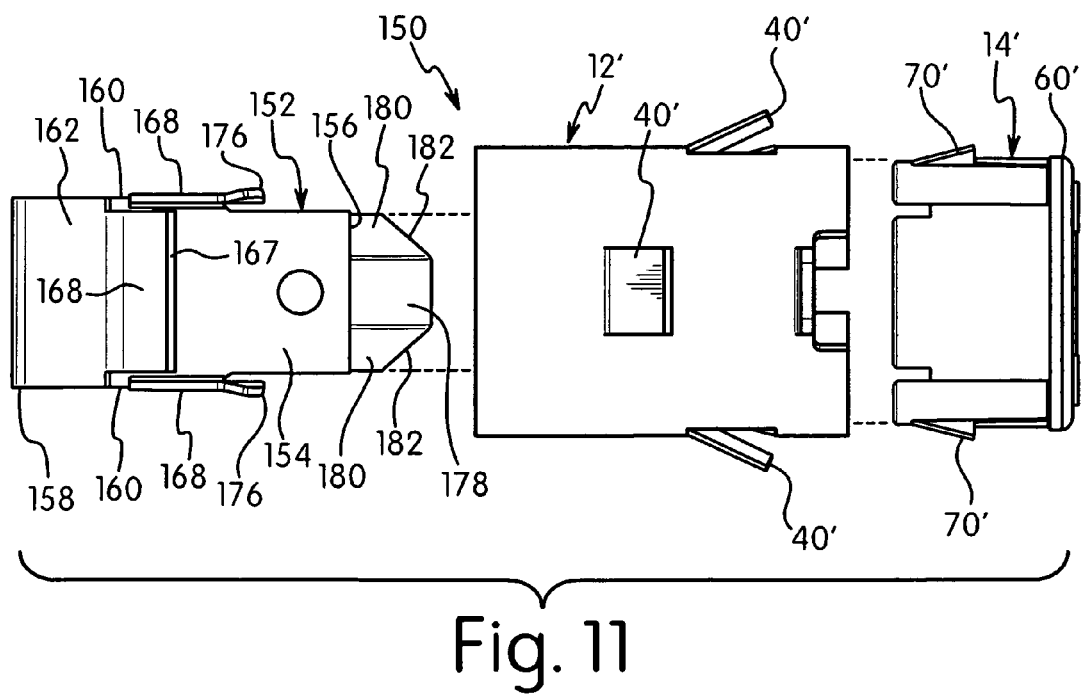
FIG. 11 is an exploded top view of the connector assembly of the embodiment of FIG. 8.
Figure 12:
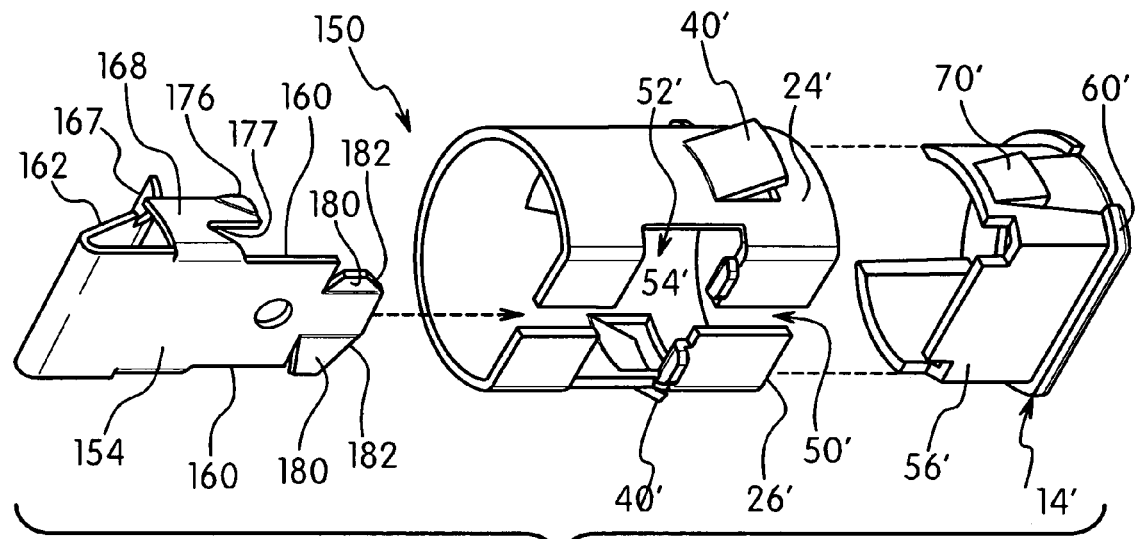
FIG. 12 is an exploded bottom perspective view of the connector assembly of the embodiment of FIG. 8.

As shown in FIGS. 10-12, spring clip 152 is coupled to the second end of body 12' in a manner similar to the embodiment of FIGS. 1-7. Spring clip 152 has a main body portion 154 that is substantially flat with a first end 156, a second end 158 and opposite side edges 160. A first leg 162 extends from second end 158 of main body portion 154. As shown, first leg 162 is integrally formed with main body portion 154 and is bent in a generally forward direction toward first end 156. First leg 162 is oriented at an incline with respect to the plane of main body portion 154 and terminates at an end portion 164 that curves outwardly away from the plane of first leg 162 and the plane of main body portion 154. In the embodiment shown, end portion 164 has a substantially straight edge 166. In alternative embodiments, the edge 167 of the end portion can have a concave or convex shape to grip the conduit as in the previous embodiment. End portion 164 typically has a width that is narrower than the width of the first leg 162.

Figure 13:
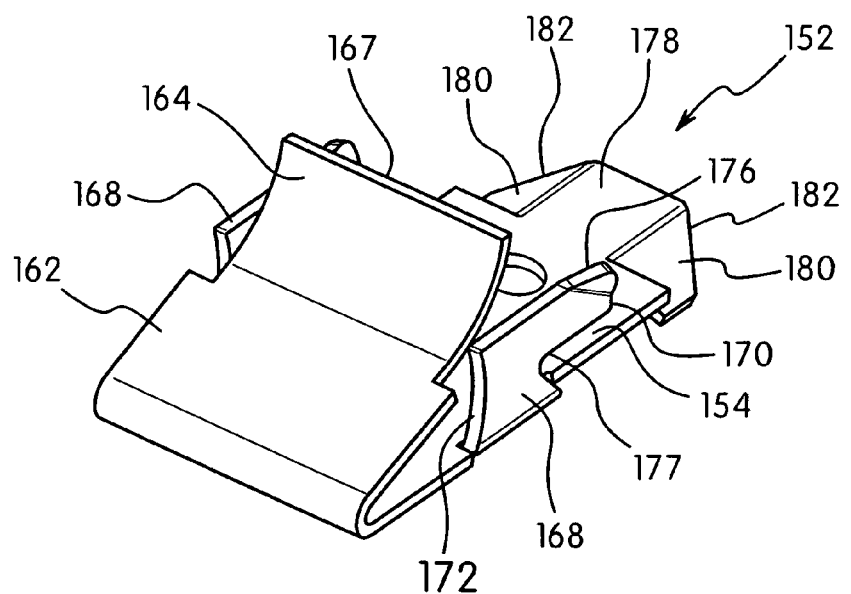
FIG. 13 is a perspective view of the spring dip of the connector assembly of the embodiment of FIG. 8.
Figure 14:
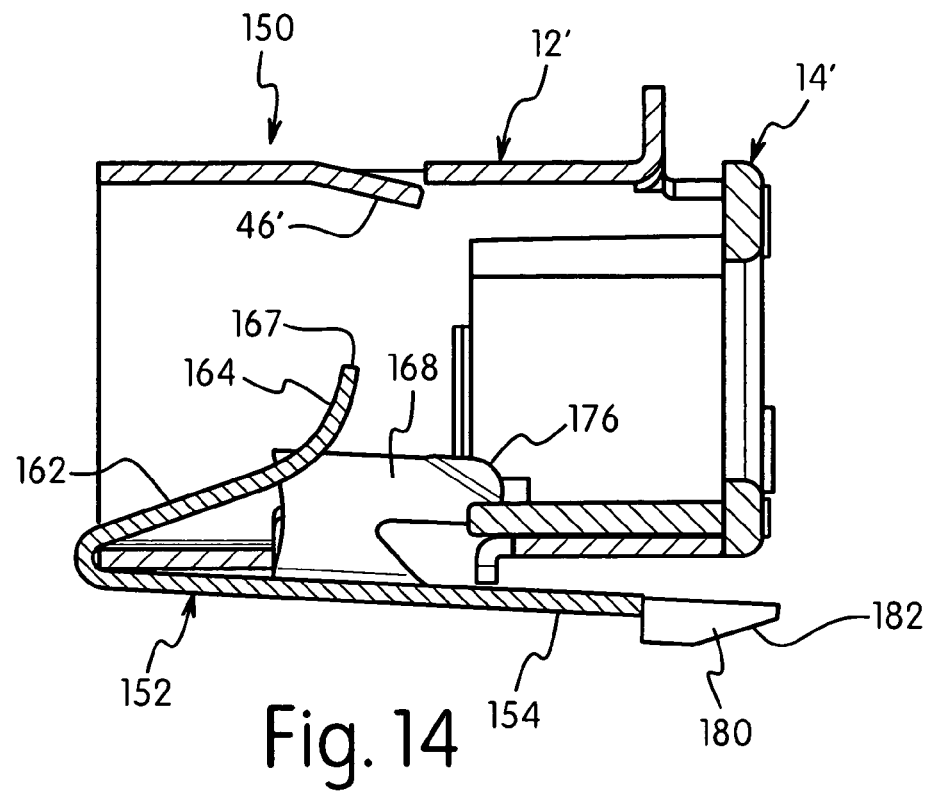
FIG. 14 is a cross-sectional side view of the cable connector assembly.

Spring clip 152 has a pair of latching members 166 on the side edge of main body portion 154 as shown in FIGS. 11 and 13. Latching members 166 are formed by a substantially planar retaining tab 168 extending perpendicular to the plane of main body portion 154. The retaining tabs 168 have a first end 170, a second end 172 and an outer edge 174 extending between first end 170 and second end 172. A latching tab 176 is formed along the outer edge 174 of retaining tab 168. Latching tab 176 is positioned for coupling with body 12' to couple spring clip 152 to body 12' in a manner similar to the previous embodiment. In the embodiment shown, latching tab 176 is a planar tab that is bent outwardly at an angle with respect to the plane of retaining tab 168 and extends at an angle between outer edge 174 and first end 170. In the embodiment shown, second end 172 has a curved concave shape. First end 170 is formed with a recessed, hook-like portion 177.

A second leg 178 extends from main body portion 154 and has a width less than the width of main body portion 154. A pair of coupling tabs 180 extend from side edges of second leg 178 and are angled away from main body portion 154 opposite first leg 162. As shown, the leading edge 182 of coupling tabs 180 are angled to assist in inserting through the opening in an electrical box.

Figure 15:
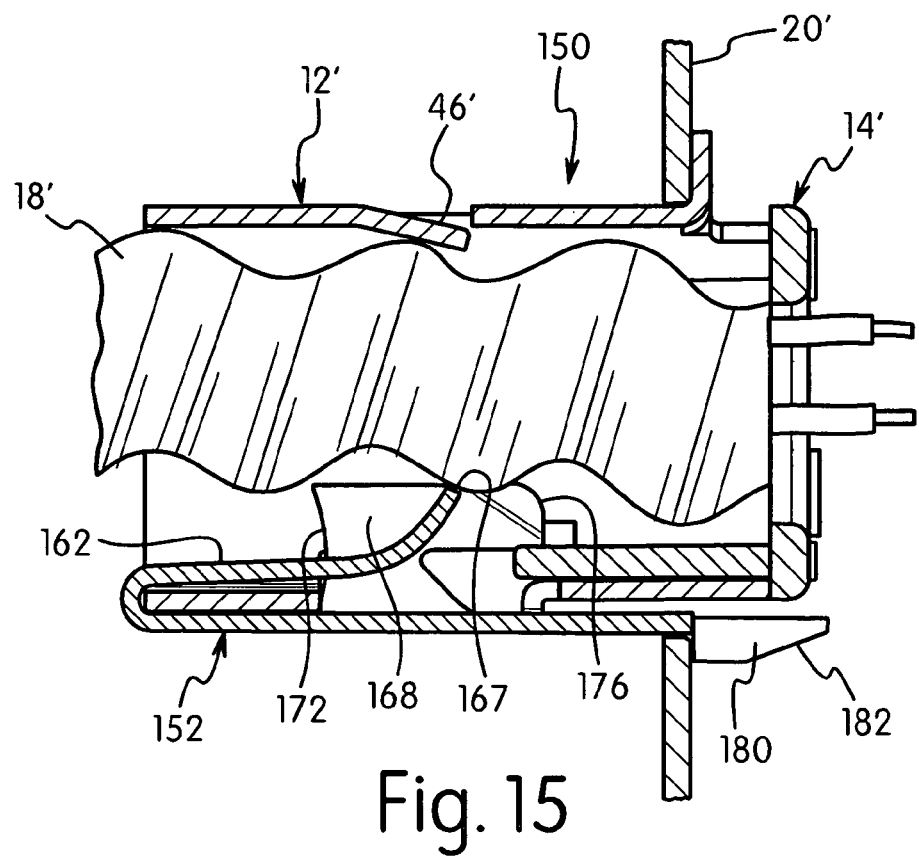
FIG. 15 is a cross-sectional side view of the cable connector assembly showing an armored cable clamped to the connector assembly.

The connector assembly 150 is assembled in a similar manner as the previous embodiment by inserting grommet 14' into the first end of body 12' and inserting the first leg 162 of spring clip 152 into the second end of body 12'. A conduit 18' such as a spiral wound armored cable is inserted into a second end of body 12' so that the wires 22' extend through the central opening in the grommet 14' as shown in FIG. 15. Spring clip 152 is then depressed to insert retaining tabs 168 through the openings 52' until latching tab 176 passes through and couples with the edge of opening 52'. Spring clip 152 is assembled with body 12' with the recess formed by the connection between first leg 162 and main body portion 154 contacts the edge of body 12' and second end 172 to resist longitudinal movement of spring clip 152 with respect to body 12'. By coupling latching tab 176 to opening 52', first leg 162 applies a biasing force to the conduit to couple the connector assembly 150 to the conduit 18'. The connector assembly 150 and the conduit then are inserted through the opening in the electrical box and the coupling tabs 180 connect to the electrical box as shown in FIG. 15.

While various embodiments have been selected to illustrate the invention it will be apparent to those skilled in the art that various changes and modifications can be made without departing from the scope of the invention as defined in the appended claims.

What is claimed is:

1. A conduit connector assembly for attaching a conduit to an electrical box, the assembly comprising:
    a body having a cylindrical side wall portion, said body having axial passage for receiving a conduit and electrical wires, said cylindrical wall portion having a first connecting tab at a first end for contacting an inner face of an electrical box, a second connecting tab for contacting an outer face of the electrical box and a gripping tab extending inwardly with respect to said body to engage an outer surface of the conduit;
    a grommet having a cylindrical body portion and a collar for connecting to the conduit, the cylindrical body portion being received in the body; and
    a spring clip coupled to said body, said spring clip having a main body portion with a first leg having a gripping end extending inwardly into said passage of said body toward said first end of said body, said gripping end being positioned for engaging said conduit to retain said conduit within said body, said spring clip having a latch member extending inwardly into said body and latching to said body whereby said gripping end of said first leg applies a constant gripping force against the conduit.

2. The connector assembly of claim 1, wherein
    said main body portion of said spring clip has a first end and second end, said first end having a second leg extending therefrom and having outwardly extending coupling tabs for coupling to an electrical box, and where said second leg is biased to apply an outward tension with respect to said assembly.

3. The connector assembly of claim 2, wherein
    said body having a substantially flat side wall portion and where said main body portion of said spring clip overlies said flat side wall portion, and where said first leg extends through a second end of said body.

4. The connector assembly of claim 1, wherein
    said latch member of said spring clip includes at least one arm extending from said main body portion in a direction toward said first leg, said at least one arm having a latching tab at an end thereof for latching to said body.

5. The connector assembly of claim 4, wherein
    said body has a side opening, and where said arm and latching tab extend through said opening to latch onto an edge of said opening.

6. The connector assembly of claim 5, wherein
    said spring member further includes a retaining tab extending toward said first leg, said retaining tab being received in said opening in said body.

7. The connector assembly of claim 5, wherein
    said latching tab engages a first edge of said opening and said retaining tab engages a second edge of said opening.

8. The connector assembly of claim 2, wherein
    said body has a side opening for receiving said latch member; and
    said latch member has a first end, second end, and a latching tab for coupling with said opening in said body.

9. The connector assembly of claim 8, wherein
    said latch member has an outer edge extending between said first end and said second end, said outer edge including a latching tab for coupling with said opening in said body.

10. The connector assembly of claim 9, wherein
    said latching tab is at an incline with respect to a plane of said latch member and extends diagonally from said outer edge to said first end of said latch member.

11. The connector assembly of claim 2, wherein
    said body has a side opening for receiving said latch member; and
    said latch member comprises a retainer tab on opposite side edges of said main body portion of said spring clip, each said retainer tab having a first end, a second end and an outer edge, said outer edge having a latching tab for coupling with said opening in said body.

12. The connector assembly of claim 11, wherein
    said latching tab extends diagonally from said outer edge to said first end of said retainer tab.

13. A conduit connector assembly for coupling a conduit to an electrical box, said conduit connector comprising:
    a body having a side wall with a first open end and a second open end and an internal axial passage extending between said first end and said second end, said first end having a dimension to be inserted into an opening in a side wall of an electrical box;
    a grommet received in said first end of said body and having an outer dimension to fit around the conduit; and
    a spring clip coupled to said body, said spring clip having a main body portion with a first leg having a gripping end extending inwardly into said axial passage for engaging the conduit to capture the conduit within said axial passage, said main body portion of said spring clip having a latch member for latching to said body to position said first leg and to apply a constant biasing force of said gripping end against said conduit.

14. The connector assembly of claim 13, wherein
    said latch member includes an arm extending from said main body portion in a direction toward said first leg, said arm having a distal end with a latching tab for coupling with said body.

15. The connector assembly of claim 14, wherein
    said side wall of said body has an opening, and where said latch member projects into said opening and said latching tab engages an edge of said opening.

16. The connector assembly of claim 15, wherein
    said arm extends from a first end of said main body portion and where said first leg extends from a second end of said main body portion.

17. The connector assembly of claim 16, wherein
    said spring clip includes a retaining tab extending in a direction toward said first leg, said retaining tab extending into said opening in said side wall of said body.

18. The connector assembly of claim 17, wherein
    said latch member engages a first edge of said opening in said body and said retaining tab engages a second edge of said opening in said body to resist longitudinal movement of said spring clip with respect to said body.

19. The connector assembly of claim 13, wherein said latch member comprises
    a retaining tab extending from said main body portion, said retaining tab having a first end, a second end and an outer edge, said outer edge having a latching tab for coupling with said body.

20. The connector assembly of claim 19, wherein
    said side wall of said body has an opening, and said latch member comprises a retaining tab extending from opposite side edges of said main body portion, each retaining tab being received in said opening for coupling said spring clip to said body.

21. The connector assembly of claim 20, wherein
each said retaining tab has a first end, a second end and an outer edge extending between said first end and said edge, and a latching tab on said outer edge for coupling to said body.

22. The connector assembly of claim 21, wherein
said latching tab extends diagonally from said outer edge to said first end of said retaining tab.

23. A conduit connector assembly for coupling an electrical conduit to an electrical box, said connector assembly comprising:
a body having a side wall with a first end and a second end and an axial passage extending between said first end and said second end, said first end having a dimension to be inserted into an opening of an electrical box, said body having an opening in said side wall, said axial passage having a dimension to receive the electrical conduit;
a grommet having a cylindrical portion received in said first end of said body and a having a collar forming a stop member for contacting said first end of said body; and
a spring clip coupled to said body, said spring clip having a main body portion overlying said side wall of said body, a first leg extending from said main body portion and extending into said axial passage through said second end of said body, a latch member extending from said main body portion, and extending from said main body portion through said side wall of said body, and a latching tab on an end of said latch member to engage an edge of said opening in said body, whereby said first leg of said spring clip applies a biasing force against the conduit to capture the conduit within said body.

24. The connector assembly of claim 23, wherein
said latching tab engages said body to couple said spring clip to said body.

25. The connector assembly of claim 23, wherein
said main body portion of said spring clip includes a retaining tab, said retaining tab extending through said opening in said body.

26. The connector assembly of claim 25, wherein said latch member engages a first edge of said opening in said body; and
said retaining tab engages a second edge of said opening.

27. The connector assembly of claim 26, wherein
said main body portion of said spring clip has a first end, a second end and opposite sides, said latch member extending from said first end, and said retaining members extending from said sides.

28. The connector assembly of claim 23, wherein
said spring clip has a second leg extending from said main body portion, said second leg having at least one outwardly extending coupling tab for coupling with the electrical box.

29. The connector assembly of claim 23, wherein said latch member comprises
a retainer tab extending from opposite side edges of said main body and having a dimension to be received in said opening in said body, each said retaining tab having a first end, a second end and an outer edge extending between said first and second sides, and where said outer edge includes a latching tab for coupling with said body.

\* \* \* \* \*